United States Patent
Jeong et al.

(10) Patent No.: US 12,460,101 B2
(45) Date of Patent: Nov. 4, 2025

(54) METHOD FOR MANUFACTURING VINYL CHLORIDE-VINYL ACETATE COPOLYMER LATEX

(71) Applicant: HANWHA SOLUTIONS CORPORATION, Seoul (KR)

(72) Inventors: Eun Soo Jeong, Daejeon (KR); Geun Chang Ryu, Daejeon (KR); Chulwoong Lee, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 758 days.

(21) Appl. No.: 17/762,109

(22) PCT Filed: Jul. 17, 2020

(86) PCT No.: PCT/KR2020/009425
§ 371 (c)(1),
(2) Date: Mar. 21, 2022

(87) PCT Pub. No.: WO2021/054593
PCT Pub. Date: Mar. 25, 2021

(65) Prior Publication Data
US 2022/0348784 A1    Nov. 3, 2022

(30) Foreign Application Priority Data
Sep. 19, 2019  (KR) .................... 10-2019-0115256

(51) Int. Cl.
C09D 127/06      (2006.01)
C08F 214/06      (2006.01)
C09D 5/02        (2006.01)

(52) U.S. Cl.
CPC .......... C09D 127/06 (2013.01); C08F 214/06 (2013.01); C09D 5/022 (2013.01); *C08F 2800/20* (2013.01)

(58) Field of Classification Search
CPC ........ C09D 127/06; C09D 5/02; C08F 214/06
USPC ....................................... 524/458
See application file for complete search history.

(56) References Cited

U.S. PATENT DOCUMENTS

| | | |
|---|---|---|
| 4,631,324 A | 12/1986 | Boeke |
| 5,853,943 A | 12/1998 | Cheng |
| 2018/0002466 A1* | 1/2018 | Lee .............. C08F 214/06 |

FOREIGN PATENT DOCUMENTS

| | | | |
|---|---|---|---|
| CN | 102485757 B | 8/2013 | |
| CN | 107207669 A | 9/2017 | |
| CN | 108424485 A | 8/2018 | |
| EP | 3235837 A1 * | 10/2017 | ............... C08F 2/24 |
| JP | 2756995 B2 | 5/1998 | |
| JP | H10139801 A | 5/1998 | |
| JP | 11124530 A | 5/1999 | |
| JP | 2000075550 A | 3/2000 | |
| JP | 2012-144703 A | 8/2012 | |
| JP | 5903856 B2 | 4/2016 | |
| JP | 2016-188334 A | 11/2016 | |
| JP | 2018-002845 A | 1/2018 | |
| JP | 2020-007388 A | 1/2020 | |
| KR | 1020080017644 A | 2/2008 | |
| KR | 101047667 B1 | 7/2011 | |
| KR | 1020150031964 A | 3/2015 | |
| KR | 1020150142181 A | 12/2015 | |
| KR | 1020170032183 A | 3/2017 | |
| KR | 101841356 B1 | 3/2018 | |

OTHER PUBLICATIONS

Hale Yamak Berber: "Emulsion Polymerization: Effects of Polymerization variables on the Properties of Vinyl Acetate Based Emulsion Polymers" Jan. 23, 2013, XP55263506.

* cited by examiner

*Primary Examiner* — Deve V Hall
(74) *Attorney, Agent, or Firm* — Harvest IP Law, LLP

(57) ABSTRACT

Provided is a method of preparing a vinyl chloride-vinyl acetate copolymer latex.
Specifically, in one embodiment of the present invention, provided is a method of preparing a latex including vinyl chloride-vinyl acetate copolymer particles with a high degree of polymerization and molecular weight and a uniform particle composition by performing an emulsion polymerization of a vinyl chloride monomer and a vinyl acetate monomer in the presence of an aqueous dispersion medium and an emulsifier while optimizing a feeding mode of the vinyl chloride monomer and the emulsifier.

11 Claims, 1 Drawing Sheet

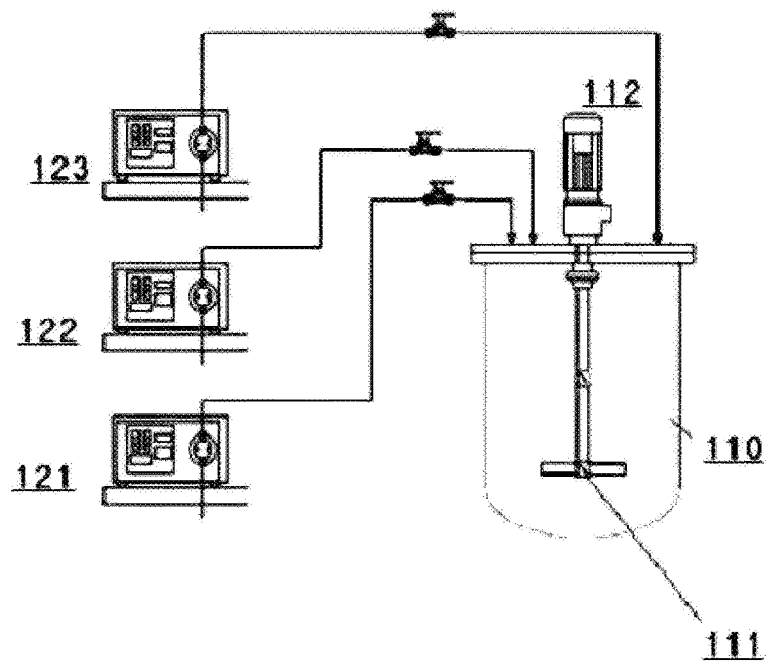

METHOD FOR MANUFACTURING VINYL CHLORIDE-VINYL ACETATE COPOLYMER LATEX

BACKGROUND OF THE INVENTION (a) Field of the Invention

Cross-Reference to Related Application(S)

This application is a National Stage of International Application No. PCT/KR2020/009425 filed Jul. 17, 2020, claiming priority based on Korean Patent Application No. 10-2019-0115256 filed on Sep. 19, 2019 with the Korean Intellectual Property Office, the disclosures of which are herein incorporated by reference in their entirety.

The present invention relates to a method of preparing a vinyl chloride-vinyl acetate copolymer latex.

(b) Description of the Related Art

A vinyl chloride-based resin is a general-purpose resin that is the most widely used in the world as a living and industrial material, and in particular, it is excellent in improving pigment dispersion and adhesion performance of inks, paints, coatings, adhesives, etc.

When the vinyl chloride-based resin is prepared, it is generally prepared as a copolymer by using a vinyl chloride monomer and a heterogeneous monomer, rather than using the vinyl chloride monomer alone as a monomer, in order to improve performances such as plasticity, fluidity, solubility, etc.

The vinyl chloride-based resin is prepared using an oily or aqueous dispersion medium, and may be obtained in the state of latex, in which vinyl chloride-based resin particles are dispersed in the dispersion medium. The resulting product is dried and pulverized to obtain the powdered vinyl chloride-based resin, or it is also possible to apply the latex as it is to products such as inks, paints, coatings, adhesives, etc.

The vinyl chloride-based resin is prepared using an oily or aqueous dispersion medium, and may be obtained in the state of latex, in which vinyl chloride-based resin particles are dispersed in the dispersion medium. The resulting product is dried and pulverized to obtain the powdered vinyl chloride-based resin, or it is also possible to apply the latex as it is to products such as inks, paints, coatings, adhesives, etc.

Specifically, when the latex, in which the vinyl chloride-based resin particles are dispersed in the dispersion medium, is applied as it is to the products, processes (i.e., a drying process and a pulverizing process) for obtaining the powdered vinyl chloride-based resin are omitted, and thus there is an advantage in that the process cost is reduced.

In the fields of inks, paints, coatings, adhesives, etc., there is a trend towards replacing existing oil-based products with eco-friendly water-based products. In accordance with this trend, the latex prepared by using the aqueous dispersion medium may be also applied as it is to the water-based products.

However, when the vinyl chloride monomer and the heterogeneous monomer are polymerized in the aqueous dispersion medium, a latex including copolymer particles with a low degree of polymerization and low molecular weight is produced, because the monomers are different from each other in terms of the reactivity. This is a challenge to be overcome in the art.

SUMMARY OF THE INVENTION

According to one embodiment of the present invention, there is provided a method of preparing a latex including vinyl chloride-vinyl acetate copolymer particles with a high degree of polymerization and a high molecular weight and a uniform particle composition.

In one embodiment of the present invention, it is intended to solve the above problem by performing an emulsion polymerization of a vinyl chloride monomer and a vinyl acetate monomer in the presence of an aqueous dispersion medium and an emulsifier while optimizing a feeding mode of the vinyl chloride monomer and the emulsifier.

Specifically, in one embodiment of the present invention, a semi-continuous reaction is used, in which parts of the vinyl acetate monomer and the vinyl chloride monomer to be reacted are reacted in the presence of the initiator and the emulsifier, and then additional feeding of the initiator, the vinyl chloride monomer, and the emulsifier is continuously performed.

According to one embodiment, it is possible to obtain a latex including vinyl chloride-vinyl acetate copolymer particles with a high degree of polymerization and a high molecular weight and a uniform particle composition by easily controlling the heat of reaction and reaction rate during a process of continuously feeding an initiator, a vinyl chloride monomer, and an emulsifier after initiating a reaction of a vinyl acetate monomer and the vinyl chloride monomer.

As described, the latex including the vinyl chloride-vinyl acetate copolymer particles with a high degree of polymerization and a high molecular weight and a uniform particle composition may be applied to products such as inks, paints, coatings, adhesives, etc., thereby contributing to the improvement of mechanical strength of the products.

Further, since an aqueous dispersion medium is used in one embodiment, it is possible to apply, to water-based products, the final product in the latex state as it is without a separate treatment, thereby contributing to the development of eco-friendly products.

BRIEF DESCRIPTION OF THE DRAWINGS

FIG. 1 illustrates a reactor applicable in one embodiment of the present invention.

DETAILED DESCRIPTION OF THE EMBODIMENTS

The present invention may be variously modified and have various forms, and specific embodiments will be illustrated and described in detail. It should be understood, however, that the description is not intended to limit the present invention to the particular forms disclosed, but on the contrary, the intention is to cover all modifications, equivalents, and alternatives falling within the spirit and scope of the invention. When it is determined that the detailed description of the known art related to the present invention may obscure the gist of the present invention, the detailed description will be omitted herein.

Further, although the terms including ordinal numbers such as first, second, etc. may be used herein to describe various elements, these elements should not be limited by these terms. These terms are only used to distinguish one element from another. For example, a first element could be termed a second element, and similarly, a second element could be termed a first element, without departing from the scope of the present invention.

The singular forms are intended to include the plural forms as well, unless the context clearly indicates otherwise. It will be further understood that the terms "including" or "having", when used herein, specify the presence of stated features, integers, steps, operations, elements, components, or combination thereof, but do not preclude the presence or addition of one or more other features, integers, steps, operations, elements, components, or combination thereof.

Hereinafter, one embodiment of the present invention will be described in detail with reference to drawings.

Method of Preparing Vinyl Chloride-Vinyl Acetate Copolymer Latex

In one embodiment of the present invention, provided is a method of preparing a latex including vinyl chloride-vinyl acetate copolymer particles with a high degree of polymerization and a high molecular weight by performing an emulsion polymerization of a vinyl chloride monomer and a vinyl acetate monomer in the presence of an aqueous dispersion medium and an emulsifier while optimizing a feeding mode of the vinyl chloride monomer and the emulsifier.

In the preparation of a latex, monomers may be generally fed in a batch, semi-continuous, or continuous feeding mode.

Here, the batch mode is a mode in which raw materials are added once, and the reaction is continued until the purpose is achieved. The continuous mode is a mode in which raw materials are continuously fed. The semi-continuous mode is a mode in which raw materials are first fed, and others are fed as the reaction proceeds. The decision as to which of these methods to use may be based on various factors such as properties of the latex preparation reaction, production volume, etc.

In detail, when a latex is prepared using a vinyl chloride monomer, it is necessary to consider that a polymer with a low degree of polymerization and a low molecular weight tends to be produced, as the temperature of the polymerization reaction is higher.

In this regard, the batch mode, in which raw materials are added once, and the reaction is continued until the purpose is achieved, may be inappropriate in that it is difficult to control the reaction rate and the heat of polymerization generated during the polymerization reaction using the vinyl chloride monomer.

Meanwhile, the continuous mode, in which raw materials are continuously fed during reaction, may suppress the heat of polymerization, as compared to the batch mode, but there is still a disadvantage in that it is difficult to control the heat of polymerization and the reaction rate as desired during the process of continuously feeding raw materials until the polymerization reaction using the vinyl chloride monomer is terminated after initiating.

In contrast, when the semi-continuous mode is used, in which only some of the raw materials is fed and reacted, and the remaining raw materials are continuously fed during the reaction, it is possible to suppress generation of excessively high heat of reaction during the polymerization reaction using the vinyl chloride monomer and to control the reaction rate.

Practically, in Experimental Example to be described later, it was confirmed that, during the preparation of the vinyl chloride-vinyl acetate copolymer latex using the vinyl chloride monomer and the vinyl acetate monomer, when the semi-continuous mode is used, a latex including vinyl chloride-vinyl acetate copolymer particles with a relatively high degree of polymerization and a high molecular weight and a uniform particle composition is obtained, as compared with use of the batch mode.

However, in Experimental Example to be described later, even though the semi-continuous mode was used to prepare a vinyl chloride-vinyl acetate copolymer latex using the vinyl chloride monomer and the vinyl acetate monomer, a latex with poor stability was often obtained, in which the stability was too poor to evaluate physical properties of the latex. Here, "too poor to evaluate physical properties" means that particles are not stably dispersed in an aqueous dispersion medium, and the stability is broken and the particles are precipitated.

More specifically, it was confirmed that when parts of a vinyl acetate monomer and a vinyl chloride monomer were reacted in the presence of an initiator and an emulsifier, and then only the initiator and the vinyl chloride monomer were additionally fed without additional feeding of the emulsifier, a latex, of which stability is too poor to evaluate physical properties thereof, was obtained.

These results suggest that when it is intended to control physical properties of a final product within a predetermined range during polymerization of a vinyl chloride monomer and a heterogeneous monomer, it is necessary to optimize the materials to be additionally fed after initiation of the polymerization reaction and the feeding order thereof by considering the different reactivity of each monomer.

In this regard, one embodiment of the present invention includes the steps of preparing a polymerization reaction of monomers by feeding an aqueous dispersion medium, an emulsifier, and a vinyl acetate monomer and a vinyl chloride monomer to a reactor; initiating the polymerization reaction of the monomers by feeding an initiator to the prepared reactor; and continuously performing the additional feeding of the vinyl chloride monomer and the emulsifier respectively to the reactor, in which the polymerization reaction of the monomers is initiated.

According to one embodiment, parts of the vinyl acetate monomer and the vinyl chloride monomer to be reacted are reacted in the presence of the initiator and the emulsifier, and then additional feeding of the initiator, the vinyl chloride monomer, and the emulsifier is continuously performed. During this process, the heat of reaction and the reaction rate may be easily controlled, and thus a latex including vinyl chloride-vinyl acetate copolymer particles with a high degree of polymerization and a high molecular weight and a uniform particle composition may be obtained.

As described, the latex including the vinyl chloride-vinyl acetate copolymer particles with a high degree of polymerization and a high molecular weight and a uniform particle composition may be applied to products such as inks, paints, coatings, adhesives, etc., thereby contributing to the improvement of mechanical strength of the products.

Furthermore, in one embodiment, since an aqueous dispersion medium is used, it is possible to apply, to water-based products, the final product in the latex state as it is without a separate treatment, thereby contributing to the development of eco-friendly products.

Hereinafter, one embodiment will be described in more detail.

In one embodiment, a weight ratio of the vinyl chloride monomer and the vinyl acetate monomer to be reacted may be 60:40 to 80:20 (the total amount of vinyl chloride monomer: the total amount of vinyl acetate monomer), and a copolymer latex prepared in this range may exhibit excellent performances such as plasticity, fluidity, solubility, etc. However, this is only an example, and the weight ratio of the total amount of the vinyl chloride monomer and the vinyl acetate monomer may be adjusted according to common sense in the art.

On the other hand, when the total amount of the vinyl chloride monomer fed before and after initiation of the polymerization reaction is regarded as 100% by weight, 20% by weight to 30% by weight thereof may be fed in a batch mode in the preparation step before initiation of the polymerization reaction, and the remainder may be continuously fed while increasing the feeding amount per hour after initiation of the polymerization reaction.

As described above, when the relatively small amount of the vinyl chloride monomer is fed before initiation of the polymerization reaction, and the relatively large amount thereof is additionally fed after initiation, thereby suppressing the heat of reaction generated in the initial stage of polymerization as much as possible. In addition, when additionally fed, the vinyl chloride monomer is continuously fed while increasing the feeding rate (feeding amount per hour), thereby suppressing the heat of reaction in the continued reaction and easily controlling the degree of polymerization and molecular weight of the copolymer to be produced by controlling the reaction rate.

In a state in which a part of the vinyl chloride monomer and the total amount of the vinyl acetate monomer are fed, the polymerization reaction of the monomers may be initiated by feeding the initiator, after the internal temperature of the reactor reaches the reaction temperature.

The reaction temperature may be controlled in the range of 40° C. to 80° C., which is a temperature range that allows the vinyl chloride monomer and the vinyl acetate monomer to react, for example, the lower limit of the reaction temperature may be 40° C., 45° C., 50° C., 55° C., or 60° C. and the upper limit thereof may be 80° C., 75° C., or 70° C.

Further, additional feeding of the emulsifier may be initiated at the same time as initiation of the additional feeding of the vinyl chloride monomer. Alternatively, at a predetermined time after initiating the additional feeding of the vinyl chloride monomer, the additional feeding of the emulsifier may be initiated. In the latter case, as compared with the former case, it is possible to obtain a latex having a relatively narrow particle size distribution and better stability.

For example, at 40 minutes to 50 minutes after the starting point of the emulsion polymerization by the feeding of the initiator, the additional feeding of the vinyl chloride monomer may be initiated, and at 10 minutes to 20 minutes after the starting point of the additional feeding of the vinyl chloride monomer, the additional feeding of the emulsifier may be initiated.

However, this is only an example, and the starting point of the additional feeding of each material may be relatively determined depending on the total polymerization reaction time. Specifically, when the total polymerization reaction time is 300 minutes to 400 minutes, the additional feeding of the vinyl chloride monomer may be initiated at the time point of $1/8$ or more and $1/6$ or less of the total polymerization reaction time, and the additional feeding of the emulsifier may be initiated at the time point of $1/7$ or more and $1/5$ or less of the total polymerization reaction time.

Meanwhile, when the additional feeding of the vinyl chloride monomer and the emulsifier is performed, the feeding amounts (i.e., feeding rate) thereof per hour may be each independently increased. In this case, the feeding rate becomes constant, and advantages such as easy control of the heat of reaction and shortening of the polymerization time may be taken, as compared with the additional feeding of the vinyl chloride monomer and the emulsifier.

In this regard, the rate of the additional feeding of the vinyl chloride monomer may be increased by three steps, and the rate of the additional feeding of the emulsifier may be increased by two steps.

For example, with regard to the vinyl chloride monomer, a first additional feeding may be performed while controlling the feeding amount per hour to 2 ml to 3 ml from the starting point of the additional feeding to a time point of $1/8$ or more and $2/5$ or less of the total polymerization reaction time; a second additional feeding may be performed while controlling the feeding amount per hour to 4 ml to 5 ml from the end point of the first additional feeding to a time point of $2/5$ or more and $3/5$ or less of the total polymerization reaction time; and a third additional feeding may be performed while controlling the feeding amount per hour to 5 ml to 6 ml from the end point of the second additional feeding to a time point of $3/5$ or more and $4/5$ or less of the total polymerization reaction time.

Further, with regard to the emulsifier, a first additional feeding may be performed while controlling the feeding amount per hour to 0.4 ml to 0.8 ml from the starting point of the additional feeding of the emulsifier to a time point of $1/7$ or more and $1/2$ or less of the total polymerization reaction time; and a second additional feeding may be performed while controlling the feeding amount per hour to 0.7 ml to 1.1 ml from the end point of the first additional feeding to a time point of $1/2$ or more and $19/20$ or less of the total polymerization reaction time.

As described, the effect of controlling the heat of reaction may be improved by varying the feeding rates of the vinyl chloride monomer and the emulsifier, respectively. However, each of the above numerical ranges is an example, and it is also possible to adjust the upper and lower limits within each numerical range.

The initiator may be continuously fed while maintaining the feeding amount per hour constant from the starting point of the polymerization reaction to the end point of the polymerization reaction, and the feeding amount thereof per hour may be maintained constant within the range of 0.7 ml to 1.1 ml. Within this range, there is an effect of preventing reduction of the molecular weight without delay of the polymerization time, but it is also possible to adjust the upper and lower limits within this range.

The end point of the polymerization reaction may be a point at which the internal pressure of the reactor is decreased by 2 kgf/cm$^2$ to 4 kgf/cm$^2$, as compared to the highest pressure of the reactor reached after additional feeding of the vinyl chloride monomer and the emulsifier. However, this is an example, and it is also possible to adjust the upper and lower limits within this range.

Details other than the above description may follow those generally known in the art. Hereinafter, those known in the art will be briefly described, but the exemplary embodiments may not be limited thereto.

Non-limiting examples of the water-soluble initiator may include one or more compounds selected from the group consisting of potassium persulfate, ammonium persulfate, sodium persulfate, sodium bisulfate, and sodium hydrosulfite.

In addition, as the emulsifier, an anionic emulsifier, a non-ionic emulsifier, or a mixture thereof may be used.

As the anionic emulsifier, specifically, an alkali metal salt or ammonium salt of a fatty acid having 6 to 20 carbon atoms, an alkali metal salt or ammonium salt of an alkylsulfonic acid having 6 to 20 carbon atoms, an alkali metal salt or ammonium salt of an alkylbenzenesulfonic acid having 6 to 20 carbon atoms, an alkali metal salt or ammonium salt of alkyl sulfate having 6 to 20 carbon atoms, an alkali metal salt or ammonium salt of alkyldisulfonic acid diphenyloxide having 6 to 20 carbon atoms, or a mixture thereof may be used.

As the non-ionic emulsifier, alcohol having 6 to 20 carbon atoms, polyethylene oxide, polyoxyethylene alkylphenylether, polyoxyethylene alkylether, sorbitan monolaurate, polyvinyl alcohol, polyethylene glycol, or a mixture thereof may be used.

The emulsifier may be added in an amount of 0.005 parts by weight to 1.0 part by weight, or 0.01 part by weight to 0.5 parts by weight, or 0.01 part by weight to 0.1 part by weight, based on 100 parts by weight of the monomer mixture. When the emulsifier is used within the above range, it is possible to improve polymerization conversion of an ethylenically unsaturated monomer having higher water solubility than a vinyl chloride-based monomer and a hydroxyl-based monomer, and particle stability.

When a mixture of the anionic emulsifier and the non-ionic emulsifier is used, the anionic emulsifier and the non-ionic emulsifier may be mixed at a weight ratio of 1:0.5 to 1:200, or 20:1 to 1:50, or 50:1 to 1:20 within the above content range of the emulsifier.

When the anionic emulsifier and the non-ionic emulsifier are mixed within the weight ratio range, stability of the slurry may be ensured, the reaction conversion rate of the ethylenically unsaturated compound may be increased as much as possible, and the thermal transport from the surface of the polymerized vinyl chloride-based resin to the inside of the resin may be prevented as much as possible.

When the emulsifier is used as the additive and the water-soluble initiator is used as the initiator, the emulsifier and the water-soluble initiator may be mixed at a weight ratio of 1:10 to 10:1, or 1:20 to 20:1, or 1:1 to 20:1, or 2:1 to 15:1.

The emulsifier or the water-soluble initiator may be positioned on the surface of the polymerized vinyl chloride-based resin to block heat transfer to the inside of resin and to minimize denaturation of the resin. Specifically, the ethylenically unsaturated monomer has relatively high water solubility, as compared to the vinyl chloride, and thus the ethylenically unsaturated monomer is more easily distributed at the outside of a vinyl chloride droplet or aqueous phase than at the inside of the vinyl chloride droplet in the emulsion polymerization in which the aqueous dispersion medium is used. In this regard, it may capture the ethylenically unsaturated monomer distributed at the outside of the vinyl chloride droplet and the aqueous phase, inducing the same to participate in polymerization, thereby enhancing a reaction conversion rate of the compound. In addition, the water-soluble initiator may likewise enhance the reaction conversion rate of the ethylenically unsaturated monomer. Further, the emulsifier and the water-soluble initiator induces formation of particle morphology distributed on the surface of the polymerized vinyl chloride-based resin, thereby minimizing a change in a molecular structure by heat. Therefore, when the emulsifier and the water-soluble initiator are mixed within the above ratio, it is possible to obtain a latex, in which a reduction in adhesion due to the use of emulsifier may be minimized.

Meanwhile, the polymerization reaction may be performed using an apparatus 100 of FIG. 1.

Specifically, the apparatus 100 of FIG. 1 may be a reactor 110 having a stirrer 111 and a magnetic drive 112, to which raw material feeding pumps 121 to 123 are connected.

Here, the raw material feeding pumps 121 to 123 are connected to containers (not shown) containing different raw materials through connection pipes, respectively. When a desired flow rate value is input to the feeding pump, a system capable of feeding the raw material corresponding to the flow rate value to the reactor 110 is provided.

Specifically, any one of the raw material feeding pumps (e.g., 121) may be connected to a container containing the vinyl chloride monomer, another of the raw material feeding pumps (e.g., 122) may be connected to a container containing the initiator, and the other of the raw material feeding pumps (e.g., 123) may be connected to a container containing the emulsifier.

Each of the raw material feeding pumps 121 to 123 may be connected to the upper portion of the reactor 110 through a connection pipe, and a valve may be positioned in the middle of each connection pipe to control feeding of the raw material.

For example, after feeding the total amount of the vinyl acetate monomer and other additives to the reactor 110, oxygen remaining in the reactor 110 may be removed using a vacuum pump (not shown). Then, only a part of the vinyl chloride monomer to be reacted is fed from the raw material feeding pump (e.g., 121) to the reactor 110, and then stirring may be started using the stirrer 111, and stirring may be performed at a constant speed until polymerization is completed. Specifically, the stirring may be performed at 100 rpm to 300 rpm. During this process, the magnetic drive 112 serves to rotate the stirrer 111.

While the stirring is continued, the internal temperature of the reactor is raised until it reaches the reaction temperature, and then the initiator may be fed at a constant rate from the raw material feeding pump 122 to the reactor 110.

After a predetermined period of time from the starting point of the continuous feeding of the initiator, the remainder of the vinyl chloride monomer to be reacted is continuously further fed from the raw material feeding pump 121 to the reactor 110, and during this process, the additional feeding amount of the vinyl chloride monomer may be increased by three steps.

Further, after a predetermined period of time from the starting point of the additional feeding of the vinyl chloride monomer, additional feeding of the emulsifier is continuously performed from the raw material feeding pump 123 to the reactor 110. During this process, the additional feeding amount of the emulsifier may be increased by two steps.

Meanwhile, the continuous feeding of the initiator may be maintained at a constant rate during the additional feeding of the vinyl chloride monomer and the emulsifier. However, when the internal pressure of the reactor after completing the feeding of the emulsifier decreases by 2 $kg/cm^2$ to 4 $kg/cm^2$ as compared to the highest pressure during continuous feeding of vinyl chloride monomer, the continuous feeding of the initiator may be terminated.

Finally, after recovering unreacted vinyl chloride monomers remaining in the gas phase in the reactor, the polymer latex may be collected by opening the bottom valve of the reactor.

However, the method of using the apparatus 100 of FIG. 1 is only an example, and any apparatus generally used for a semi-continuous reaction in the art may be used to implement the present invention without particular limitation.

Vinyl Chloride-Vinyl Acetate Copolymer Latex

In another embodiment of the present invention, provided is a vinyl chloride-vinyl acetate copolymer latex prepared by the preparation method of the above-described one embodiment, the vinyl chloride-vinyl acetate copolymer latex including an aqueous dispersion medium; and vinyl chloride-vinyl acetate copolymer particles dispersed in the aqueous dispersion medium.

The vinyl chloride-vinyl acetate copolymer latex may include copolymer particles having a volume mean diameter D[4,3] of 0.160 μm to 0.175 μm, and a particle size distribution of 1.900 to 2.300. This means that the vinyl chloride-vinyl acetate copolymer latex includes particles having a small size and a narrow size distribution, as compared with a vinyl chloride-vinyl acetate copolymer latex prepared by a batch reaction.

Here, the volume mean diameter D[4,3] of the particles and the particle size distribution thereof may be obtained using a commercially available laser diffraction particle size analyzer. Specifically, when the vinyl chloride-vinyl acetate copolymer latex is introduced into a laser diffraction particle size analyzer (e.g., Mastersizer, etc.), and a laser beam is irradiated to pass through the latex, a diffraction pattern difference may occur according to the size of the copolymer particles in the latex.

The laser diffraction particle size analyzer analyzes the difference in the diffraction patterns generated in the device, calculates the mean diameter of spheres having the same surface area as the actual copolymer particles, and designates it as the D[4,3] value, and also analyzes the copolymer particle size distribution.

On the other hand, uniformity of the particle composition may be indirectly determined from a glass transition temperature. The vinyl chloride-vinyl acetate copolymer latex prepared by the semi-continuous mode according to the above-described embodiment may have one (1 point) glass transition temperature, whereas the vinyl chloride-vinyl acetate copolymer latex prepared by the batch mode may have two (2 points) glass transition temperatures.

Specifically, the vinyl chloride-vinyl acetate copolymer latex prepared by the semi-continuous mode according to the above-described embodiment may have a glass transition temperature of 60° C. to 70° C.

The vinyl chloride-vinyl acetate copolymer latex may have a weight average molecular weight of 80,000 g/mole to 85,000 g/mole, which is the increased range, as compared with the vinyl chloride-vinyl acetate copolymer latex prepared by the batch mode.

As described, copolymer particles with a high degree of polymerization and a high molecular weight may contribute to improving mechanical strength, when applied to products such as inks, paints, coatings, adhesives, etc. to form a coating film.

In addition, in one embodiment, the aqueous dispersion medium is used, and thus it is possible to apply, to water-based products, the final product in the latex state as it is without a separate treatment.

The range of the water-based products is not particularly limited as long as they are living and industrial materials including inks, paints, coatings, adhesives, etc.

The particle size and size distribution, glass transition temperature, and weight average molecular weight of the vinyl chloride-vinyl acetate copolymer latex may be controlled as desired within each range by controlling the feeding conditions of the raw materials according to the above-described preparation method of one embodiment.

The method of controlling the feeding conditions of the raw materials is the same as those described above in detail, and further description will be omitted.

The vinyl chloride-vinyl acetate copolymer latex may be prepared as a resin composition by further adding a plasticizer; and a resin selected from ethylene vinyl acetate, polyethylene, polypropylene, polyvinyl chloride, polystyrene, polyurethane, polybutadiene, silicone, thermoplastic elastomers, and copolymers thereof.

The plasticizer may be a plasticizer generally known in the art. For example, a plasticizer including a phthalate or terephthalate compound may be used, and the phthalate or terephthalate compound may be hydrogenated to be used as the plasticizer.

The resin composition may be applied to various products. For example, the resin composition may be applied to products such as stabilizers, paints, inks, liquid foaming agents (Masterbatch types), adhesives, etc. In addition, the resin composition may be applied to the production of food packaging films (e.g., wrap), industrial films, compounds, decor sheets, decor tiles, soft sheets, hard sheets, wires and cables, wallpaper, foam mat, synthetic leathers, flooring, tarpaulin, gloves, sealant, gaskets of refrigerator, etc., hoses, medical devices, geogrid, mesh tarpaulin, toy products, stationery, insulation tapes, clothing coatings, PVC labels used for clothing or stationery, bottle cap liners, industrial or other stoppers, artificial baits, components in electronic devices (e.g., sleeve), automotive interior materials, adhesives, coatings, etc., but is not limited thereto.

Hereinafter, the actions and effects of the present invention will be described in more detail with reference to the specific exemplary embodiments of the present invention. However, these exemplary embodiments are only for illustrating the present invention, and the scope of the present invention is not limited thereto.

Example 1 (Semi-Continuous System)

(1) The total amount of vinyl acetate monomer to be reacted was fed to a 5 L-capacity autoclave reactor having a stirrer to prepare a reaction. In this process, a part of emulsifier was also fed.

In detail, 462 g of vinyl acetate monomer, 1290 g of distilled water, 1.41 g of sodium metabisulfite as a reducing agent, 1.21 g of sodium lauryl sulfate (100% solid phase) as an emulsifier, 0.62 g of glyceryl monostearate, 1.3 g of sodium bicarbonate as a buffering agent, and 6 g of 0.001% copper sulfate as a co-catalyst were fed, and oxygen remaining in the reactor was removed using a vacuum pump.

(2) Then, a part of vinyl chloride monomer to be reacted was fed, and an initiator was continuously fed to initiate a polymerization reaction.

In detail, the total amount of the vinyl chloride monomer to be reacted was 1078 g, of which 20% by weight (216 g) was fed to the reactor, and the reactor was heated until the internal temperature of the reactor reached 65° C.

After the internal temperature of the reactor reached 65° C., the polymerization reaction was initiated by continuously feeding the initiator at a flow rate of 0.87 ml/min. The initiator was a 0.055% potassium persulfate solution, in which a solvent of this solution was distilled water, and the content (%) is based on the content of the solute with respect to the total weight of the solution (100% by weight).

(3) After a predetermined period of time from the starting point of the polymerization reaction (i.e., the starting point of the feeding of the initiator), the remainder of the vinyl chloride monomer to be reacted was fed, and the emulsifier was additionally fed. During this process, while continuously feeding the initiator, the remainder of the vinyl chloride monomer was fed at a gradually increasing flow rate by three steps, and the emulsifier was additionally fed at a gradually increasing flow rate by two steps.

Specifically, after 40 minutes to 50 minutes from the starting point of the polymerization reaction, the remainder (80% of the total amount, 862 g) of the vinyl chloride monomer to be reacted was continuously fed. In this regard, from the starting point of the feeding of the remainder of the vinyl chloride monomer to 23 minutes, it was continuously fed at a flow rate of 2.54 ml/min (step 1), from the ending point of the feeding of the step 1 to 135 minutes, it was continuously fed at a flow rate of 4.42 ml/min (step 2), and from the ending point of the feeding of the step 2 to 68 minutes, it was continuously fed at a flow rate of 5.74 ml/min (step 3).

On the other hand, after 10 minutes to 20 minutes from the starting point of the feeding of the remainder of the vinyl chloride monomer, continuous additional feeding of the emulsifier was initiated. Here, the emulsifier was a 4% sodium lauryl sulfate solution, in which a solvent of this solution was distilled water, and the content (%) is based on the content of the solute with respect to the total weight of the solution (100% by weight).

In this regard, from the starting point of the additional feeding of the emulsifier to 107 minutes, it was continuously fed at a flow rate of 0.74 ml/min (step 1), and from the ending point of the feeding of the step 1 to 161 minutes, it was continuously fed at a flow rate of 1.08 ml/min (step 2).

During the additional feeding of the remainder of the vinyl chloride monomer and the emulsifier, the initiator was continuously fed.

When the internal pressure of the reactor after completing the feeding of the emulsifier decreased by 2 kg/cm$^2$ to 4 kg/cm$^2$ as compared to the highest pressure during continuous feeding of the vinyl chloride monomer, the feeding of the initiator was terminated.

Finally, after recovering unreacted vinyl chloride monomers remaining in the gas phase in the reactor, the polymer latex was collected by opening the bottom valve of the reactor.

Example 2

In the same manner as (1) and (2) of Example 1, the total amount of the vinyl acetate monomer and a part of the vinyl chloride monomer to be reacted therewith were fed to the reactor, and the initiator was continuously fed in the presence of the emulsifier to initiate a polymerization reaction.

Further, at the same time point as (3) of Example 1, additional feeding of the remainder of the vinyl chloride monomer and the emulsifier was started. However, the rate of the additional feeding of each material was different from that of Example 1.

Specifically, after 40 minutes to 50 minutes from the starting point of the polymerization reaction, feeding of the remainder (80% of the total amount, 862 g) of the vinyl chloride monomer to be reacted was started. In this regard, from the starting point of the feeding thereof to 20 minutes, it was continuously fed at a flow rate of 2.94 ml/min (step 1), from the ending point of the feeding of the step 1 to 117 minutes, it was continuously fed at a flow rate of 5.10 ml/min (step 2), and from the ending point of the feeding of the step 2 to 59 minutes, it was continuously fed at a flow rate of 6.62 ml/min (step 3).

Further, after 10 minutes to 20 minutes from the starting point of the feeding of the remainder of the vinyl chloride monomer, continuous additional feeding of the emulsifier (4% sodium lauryl sulfate solution) was initiated. In this regard, from the starting point of the additional feeding thereof to 95 minutes, it was continuously fed at a flow rate of 0.84 ml/min (step 1), and from the ending point of the feeding of the step 1 to 143 minutes, it was continuously fed at a flow rate of 1.22 ml/min (step 2).

Others were performed in the same manner as in Example 1. Specifically, during the additional feeding of the remainder of the vinyl chloride monomer and the emulsifier, the initiator was continuously fed at a flow rate of 0.87 ml/min. When the internal pressure of the reactor after completing the feeding of the emulsifier decreased by 2 kg/cm$^2$ to 4 kg/cm$^2$ as compared to the highest pressure during continuous feeding of the vinyl chloride monomer, the feeding of the initiator was terminated. Finally, after recovering unreacted vinyl chloride monomers remaining in the gas phase in the reactor, the polymer latex was collected by opening the bottom valve of the reactor.

Example 3

In the same manner as (1) and (2) of Example 1, the total amount of the vinyl acetate monomer and a part of the vinyl chloride monomer to be reacted therewith were fed to the reactor, and the initiator was continuously fed in the presence of the emulsifier to initiate a polymerization reaction.

Meanwhile, at the different time point as (3) of Example 1, additional feeding of the remainder of the vinyl chloride monomer and the emulsifier was initiated. However, the rate of the additional feeding of each material was the same as that of Example 1.

Specifically, after 20 minutes to 30 minutes from the starting point of the polymerization reaction, feeding of the remainder (80% of the total amount, 862 g) of the vinyl chloride monomer to be reacted was started. In this regard, from the starting point of the feeding thereof to 23 minutes, it was continuously fed at a flow rate of 2.54 ml/min (step 1), from the ending point of the feeding of the step 1 to 135 minutes, it was continuously fed at a flow rate of 4.42 ml/min (step 2), and from the ending point of the feeding of the step 2 to 68 minutes, it was continuously fed at a flow rate of 5.74 ml/min (step 3).

Meanwhile, after 10 minutes to 20 minutes from the starting point of the feeding of the remainder of the vinyl chloride monomer, continuous additional feeding of the emulsifier (4% sodium lauryl sulfate solution) was initiated. In this regard, from the starting point of the additional feeding thereof to 107 minutes, it was continuously fed at a flow rate of 0.74 ml/min (step 1), and from the ending point of the feeding of the step 1 to 161 minutes, it was continuously fed at a flow rate of 1.08 ml/min (step 2).

Others were performed in the same manner as in Example 1. Specifically, during the additional feeding of the remainder of the vinyl chloride monomer and the emulsifier, the initiator was continuously fed at a flow rate of 0.87 ml/min. When the internal pressure of the reactor after completing the feeding of the emulsifier decreased by 2 kg/cm$^2$ to 4 kg/cm$^2$ as compared to the highest pressure during continuous feeding of the vinyl chloride monomer, the feeding of the initiator was terminated. Finally, after recovering unreacted vinyl chloride monomers remaining in the gas phase in the reactor, the polymer latex was collected by opening the bottom valve of the reactor.

Comparative Example 1 (Batch System)

The total amount of the vinyl acetate monomer and the total amount of the vinyl chloride monomer were fed to a 5 L-capacity autoclave reactor having a stirrer in the presence of an emulsifier and an initiator to initiate a polymerization reaction.

(1) In detail, 462 g of the vinyl acetate monomer, 1290 g of distilled water, 1.41 g of sodium metabisulfite (100%, solid phase) as a reducing agent, 0.17 g of potassium persulfate (100% solid phase) as an initiator, 11.37 g of sodium lauryl sulfate (100% solid phase) as an emulsifier, and 0.62 g of glyceryl monostearate, 1.3 g of sodium bicarbonate as a buffering agent, and 6 g of 0.001% copper sulfate as a co-catalyst were fed, and oxygen remaining in the reactor was removed using a vacuum pump.

(2) Thereafter, the total amount (1,078 g) of the vinyl chloride monomer to be reacted was fed in a batch mode. Heating was started, and the reaction was allowed while maintaining the polymerization temperature at 65° C. During this process, additional feeding of the initiator and the emulsifier was not performed.

When the internal pressure of the reactor decreased by 2 kg/cm$^2$ to 4 kg/cm$^2$ as compared to the highest pressure during the reaction, the reaction was terminated. The unreacted vinyl chloride monomers remaining in the gas phase in the reactor were recovered, and the polymer latex was collected by opening the bottom valve of the reactor.

Comparative Example 2

In the same manner as (1) and (2) of Example 1, the total amount of the vinyl acetate monomer and a part of the vinyl chloride monomer to be reacted therewith were fed to the reactor, and the initiator was continuously fed in the presence of the emulsifier to initiate a polymerization reaction.

Further, at the same time point as (3) of Example 1, additional feeding of the remainder of the vinyl chloride monomer was started. However, unlike (3) of Example 1, no additional feeding of the emulsifier was performed, and the feeding rate of the vinyl chloride monomer was maintained constant without changing the feeding rate.

Specifically, after 40 minutes to 50 minutes from the starting point of the polymerization reaction, feeding of the remainder (80% of the total amount, 862 g) of the vinyl chloride monomer to be reacted was started. In this regard, from the starting point of the feeding thereof to 225 minutes, it was continuously fed at a flow rate of 4.21 ml/min.

Others were performed in the same manner as in Example 1. Specifically, during the additional feeding of the remainder of the vinyl chloride monomer, the initiator was continuously fed at a flow rate of 0.87 ml/min. Then, when the internal pressure of the reactor decreased by 2 kg/cm$^2$ to 4 kg/cm$^2$ as compared to the highest pressure during continuous feeding of the vinyl chloride monomer, the feeding of the initiator was terminated. Finally, after recovering unreacted vinyl chloride monomers remaining in the gas phase in the reactor, the polymer latex was collected by opening the bottom valve of the reactor.

Experimental Example

Each of the latexes prepared in Examples and Comparative Examples was evaluated by the following methods, and the evaluation results are recorded in Table 1.

Particle size D[4,3] and Particles size distribution: Each latex was diluted with distilled water at a concentration of 10% to 20%, and introduced into a laser diffraction particle size analyzer (manufacturer: Malvern Panalytical, device name: Mastersizer 3000). When a laser beam was irradiated to pass through the latex, a difference in the diffraction patterns occurred according to the particle size. The volume mean diameter D[4,3] of the copolymer particles in the latex was obtained therefrom, and the particle size distribution was obtained.

Glass transition temperature: Each of the latexes was dried to obtain a powder thereof while changing the temperature from 0° C. to 140° C. using a differential scanning calorimeter (DSC, device name: DSC 2920, manufacturer: TA instrument), and the energy graph of each powder was obtained, and the temperature at the inflection point shown in the graph was used as a glass transition temperature.

Weight average molecular weight: Each latex was dried and pulverized to obtain a powder, and each powder was dissolved in tetrahydrofuran (THF), and a weight average molecular weight was obtained at room temperature using gel permeation chromatography (GPC).

TABLE 1

| | | Example 1 | Comparative Example 1 | Example 2 | Example 3 | Comparative Example 2 |
|---|---|---|---|---|---|---|
| Preparation method | Polymerization method | Emulsion polymerization | Emulsion polymerization | Emulsion polymerization | Emulsion polymerization | Emulsion polymerization |
| | Reactor operation mode (monomer feeding mode) | Semi-continuous | Batch | Semi-continuous | Semi-continuous | Semi-continuous |
| Evaluation of prepared latex | Particle size | 0.172 μm | 0.180 μm | 0.173 μm | 0.172 μm | Not measurable |
| | Particle size distribution | 2.171 | 3.457 | 2.096 | 2.158 | Not measurable |
| | Glass transition temperature | 64° C. | 32° C. and 80° C. | 64° C. | 63.5° C. | Not measurable |
| | Weight average molecular weight | 83,394 g/mole | 79,818 g/mole | 82,994 g/mole | 83,226 g/mole | Not measurable |

Referring to Table 1, the latex of Example 1 was confirmed to include the vinyl chloride-vinyl acetate copolymer particles with a high degree of polymerization and a high molecular weight and a uniform particle composition, as compared to the latex of Comparative Example 1.

For reference, uniformity of the particle composition may be indirectly determined from the glass transition temperature. The uniform latex of Example 1 has one (1 point) glass transition temperature, whereas the latex of Comparative Example 1 with a non-uniform particle composition has two (2 points) glass transition temperatures.

The difference in physical properties of the latex of Example 1 and the latex of Comparative Example 1 is due to the difference in the reactor operation mode. In the polymerization reaction using vinyl chloride monomers, as the reaction temperature increases, a polymer with a low degree of polymerization and a low molecular weight tends to be prepared.

Specifically, in Comparative Example 1, the batch mode was used, in which raw materials (here, monomers, initiator, and emulsifier) are added once, and the reaction is continued until the purpose is achieved. Thus, it is difficult to control the heat of polymerization generated during the reaction and the reaction rate.

In contrast, in Example 1, the semi-continuous mode was used, in which parts of the vinyl acetate monomer and the vinyl chloride monomer were reacted in the presence of the initiator and the emulsifier, and then continuous additional feeding of the initiator, the vinyl chloride monomer, and the emulsifier was performed.

In Example 1, during continuous additional feeding of the initiator, the vinyl chloride monomer, and the emulsifier, the feeding rate thereof (feeding amount per hour) was controlled to suppress generation of excessively high heat of reaction and to control the reaction rate within an appropriate range.

Accordingly, when the semi-continuous mode is used as in Example 1, in which parts of the vinyl acetate monomer and the vinyl chloride monomer to be reacted were reacted in the presence of the initiator and the emulsifier, and then continuous additional feeding of the initiator, the vinyl chloride monomer, and the emulsifier was performed, it is possible to obtain a latex including vinyl chloride-vinyl acetate copolymer particles with a relatively high degree of polymerization and a high molecular weight and a uniform particle composition, as compared with the batch mode as in Comparative Example 1.

However, even though the semi-continuous mode is adopted, when additional feeding of the initiator and the vinyl chloride monomer was only performed without additional feeding of the emulsifier, it is difficult to obtain a latex having the physical properties as in Example 1.

This is because, unless the emulsifier is additionally fed, the vinyl chloride monomer additionally fed cannot participate in the polymerization reaction. Practically, in Comparative Example 2 corresponding to this case, the physical properties of the final product were not measurable.

Meanwhile, it is also possible to make the rate of the additional feeding of each of the vinyl chloride monomer, the initiator, and the emulsifier different from that of Example 1, or to make the additional feeding time thereof different from that of Example 1, while adopting the semi-continuous mode as in Example 1.

Specifically, the former corresponds to Example 2, and the latter corresponds to Example 3, all of which obtained latexes at the same level as in Example 1 in terms of the size D[4,3], particle size distribution, glass transition temperature, molecular weight of the vinyl chloride-vinyl acetate copolymer particles, etc.

In this regard, within the scope of one embodiment described above, it will be possible to control the rate of the additional feeding or the time of additional feeding of each material, and to control the distribution, glass transition temperature, molecular weight of the final product, etc.

DESCRIPTION OF SYMBOLS

100: Polymerization apparatus
111: Stirrer
112: Magnetic drive
121 to 123: Raw material feeding pumps

What is claimed is:

1. A method of preparing a vinyl chloride-vinyl acetate copolymer latex, the method comprising the steps of:
    preparing a polymerization reaction by feeding an aqueous dispersion medium, an emulsifier, and a vinyl acetate monomer and a vinyl chloride monomer to a reactor;
    initiating the polymerization reaction by feeding an initiator to the prepared reactor; and
    continuously further feeding the vinyl chloride monomer and the emulsifier to the reactor, in which the polymerization reaction is initiated, respectively, and
    wherein 20% by weight to 30% by weight of the total amount (100% by weight) of the vinyl chloride monomer to be reacted is fed in a batch mode in the preparation step before initiation of the polymerization reaction, and the remainder is continuously fed while increasing the feeding amount per hour after initiation of the polymerization reaction.

2. The method of claim 1, wherein a weight ratio of the vinyl chloride monomer and the vinyl acetate monomer to be reacted is 60:40 to 80:20 (the total amount of vinyl chloride monomer: the total amount of vinyl acetate monomer).

3. The method of claim 1, wherein the feeding of the initiator is initiated, after the internal temperature of the prepared reactor reaches 40° C. to 80° C.

4. The method of claim 1, wherein the additional feeding of the vinyl chloride monomer is initiated at a time point of ⅛ or more and ⅙ or less of the total polymerization reaction time.

5. The method of claim 4, wherein the additional feeding of the emulsifier is initiated at a time point of 1/7 or more and ⅕ or less of the total polymerization reaction time.

6. The method of claim 1, wherein when the additional feeding of the vinyl chloride monomer and the emulsifier is performed, the feeding amounts thereof per hour are each independently increased.

7. The method of claim 6, wherein when the additional feeding of the vinyl chloride monomer is performed,
    a first additional feeding is performed while controlling the feeding amount per hour to 2 ml to 3 ml from the starting point of the additional feeding of the vinyl chloride monomer to a time point of ⅛ or more and ⅖ or less of the total polymerization reaction time,
    a second additional feeding is performed while controlling the feeding amount per hour to 4 ml to 5 ml from the end point of the first additional feeding to a time point of ⅖ or more and ⅗ or less of the total polymerization reaction time, and
    a third additional feeding is performed while controlling the feeding amount per hour to 5 ml to 6 ml from the end point of the second additional feeding to a time point of ⅗ or more and ⅘ or less of the total polymerization reaction time.

8. The method of claim 6, wherein when the additional feeding of the emulsifier is performed,
    a first additional feeding is performed while controlling the feeding amount per hour to 0.4 ml to 0.8 ml from the starting point of the additional feeding of the emulsifier to a time point of 1/7 or more and ½ or less of the total polymerization reaction time, and
    a second feeding is performed while controlling the feeding amount per hour to 0.7 ml to 1.1 ml from the end point of the first additional feeding to a time point of ½ or more and 19/20 or less of the total polymerization reaction time.

9. The method of claim 1, wherein the initiator is continuously fed while maintaining the feeding amount per hour constant from the starting point of the polymerization reaction to the end point of the polymerization reaction.

10. The method of claim 9, wherein the feeding amount of the initiator per hour is maintained constant within the range of 0.7 ml to 1.1 ml.

11. The method of claim 1, wherein the end point of the polymerization reaction is a point at which the internal pressure of the reactor is lowered by 2 kgf/cm² to 4 kgf/cm², as compared to the highest pressure of the reactor reached after the additional feeding of the vinyl chloride monomer and the emulsifier.

\* \* \* \* \*